UNITED STATES PATENT OFFICE.

GEORGE M. BRADFORD AND JAMES E. BROADHEAD, OF BAY CITY, MICHIGAN.

METHOD OF RECOVERING BY-PRODUCTS FROM WASTE LIQUORS.

1,342,737. Specification of Letters Patent. Patented June 8, 1920.

No Drawing. Application filed September 16, 1918. Serial No. 254,304.

*To all whom it may concern:*

Be it known that we, GEORGE M. BRADFORD and JAMES E. BROADHEAD, both citizens of the United States, residing at Bay City, in the county of Bay and State of Michigan, have invented certain new and useful Improvements in Methods of Recovering By-Products from Waste Liquors; and we do hereby declare the following to be a full, clear, and exact description of the invention, such as will enable others skilled in the art to which appertains to make and use the same.

This invention relates to an improved method for recovering potash and other products from liquor obtained as a by-product of sugar factories and commonly known in the trade as Steffens waste liquor.

Our improved process is also adapted for the recovery of similar products from other refuse liquors, as for instance, the by-products or refuse liquors of plants engaged in the manufacture of alcohol from molasses.

Our present invention pertains more particularly to an improved method for breaking down the concentrated liquor which constitutes the raw material to be treated and separating the by-products so obtained, as will be herein explained and pointed out in the claims.

In carrying out our improved method we take a quantity of the raw material, which may be Steffens waste liquor, concentrate it by evaporation to a density of approximately thirty degrees Baumé and then subject the concentrated liquor to the action of the arc of an electric furnace or retort. There results, first, evaporation and further concentration of the liquor with the driving off of vapors such as the vapor of water and ammonia, followed, as heating progresses, by the partial combustion of the material and finally by the complete combustion of the combustible constituents in the material.

The early stage of combustion is attended by the driving off of volatile gases and the liberating of liquid tar and this is also true of the somewhat later stage of combustion.

In our improved method we collect in suitable containers the vapors and gases resulting from evaporation and also the tar and the gases resulting from the various stages of combustion.

The products of combustion contained in the gases are complex in their composition, but contain recoverable quantities of di-methylamin, tri-methylamin, and cyanogen.

Under certain conditions of treatment the gases may also produce methyl chlorid.

In the solid residue after combustion is completed, is found recoverable quantities of potash, the larger part of which is in the form of potassium carbonate. The mass will also contain potasium chlorid and a small amount of potassium sulfate.

To recover from the solid residue potash in the form of high-grade potassium carbonate, the usual process of leaching and evaporating is preferably employed.

To recover potash in the form of potassium chlorid the solid residue, after combustion, can be treated with a dilute solution of commercial muriatic acid. This fluid is then concentrated by evaporation until the point of saturation with potassium chlorid is reached, the liquor meanwhile being kept hot. Upon reaching the point of concentration the liquor is cooled and potassium chlorid is deposited by crystallization. The resulting potassium chlorid can be further treated by centrifuging and washing with cold water.

While we have described only a few of the possible by-product recoveries that may be effected after employing our improved method of breaking down Steffens or like liquors into their components, it will be understood that many other methods may be employed for further reducing the by-products so obtained, and the production of various commercial substances from them.

Having thus described our invention, what we claim and desire to secure by Letters Patent is:

1. The method of recovering by-products from Steffens waste liquors, which consists in, first, concentrating the waste liquor by evaporation to approximately thirty degrees Baumé; second, subjecting the concentrated liquor to the action of an electric current of sufficient intensity to produce an arc in said liquor, whereby evaporation, combined with electrolytic dissociation is first produced, followed by complete combustion; third, cooling the gaseous products of evaporation and combustion and recovering the solid potash-bearing products remaining after combustion.

2. The method of recovering by-products from concentrated waste liquor comprising, first, subjecting said concentrated liquor to the action of an electric current of sufficient intensity to produce an arc in said liquor, whereby evaporation, combined with electrolytic dissociation is produced, followed by complete combustion; and separately cooling the gaseous products of evaporation and combustion and recovering the solid potash-bearing products of combustion.

In testimony whereof we affix our signatures in presence of two witnesses.

GEORGE M. BRADFORD.
JAMES E. BROADHEAD.

Witnesses:
OLIVE R. MILLER,
BELLA A. JARMAN.